United States Patent [19]

Sorriaux

[11] Patent Number: 4,682,349
[45] Date of Patent: Jul. 21, 1987

[54] SWITCHING SYSTEM WITH VIDEO SWITCHING MATRIX

[76] Inventor: Pierre Sorriaux, 13, Place G. Braque, 95100 Argenteuil, France

[21] Appl. No.: 720,772

[22] Filed: Apr. 8, 1985

[30] Foreign Application Priority Data

Apr. 10, 1984 [FR] France ............................ 84 05669

[51] Int. Cl.⁴ ...................... H04Q 3/52; H04N 5/268
[52] U.S. Cl. ...................................... 379/54; 379/53
[58] Field of Search ............... 179/2 TV, 2 TS, 18 C, 179/18 GF; 358/85, 181; 379/53, 54

[56] References Cited

U.S. PATENT DOCUMENTS

| | | | |
|---|---|---|---|
| 3,519,744 | 7/1970 | Dorros et al. | 179/2 |
| 3,654,566 | 4/1972 | Wellhausen et al. | 330/124 |
| 3,662,110 | 5/1972 | Van Fossen et al. | 179/2 TV |
| 3,766,324 | 9/1973 | Budrys | 179/18 E |
| 4,024,352 | 5/1977 | Mukaemachi et al. | 179/18 GF |
| 4,054,908 | 9/1977 | Poirier et al. | 358/85 |
| 4,402,008 | 8/1983 | Teraslinna | 358/86 |
| 4,446,552 | 5/1984 | Tweedy | 370/58 |
| 4,533,943 | 8/1985 | Poirier | 358/85 |

FOREIGN PATENT DOCUMENTS

| | | |
|---|---|---|
| 2407831 | 7/1975 | Fed. Rep. of Germany . |
| 2341998 | 9/1977 | France . |
| 1467790 | 3/1977 | United Kingdom . |
| 2113046 | 7/1983 | United Kingdom . |

Primary Examiner—Gene Z. Rubinson
Assistant Examiner—Matthew E. Connors
Attorney, Agent, or Firm—Blum Kaplan

[57] ABSTRACT

The switching matrix comprises two data bus each one with n channels for conveying video signals, one address bus, control conductors and an array of N switching points; each of said switching points has two output switches, two input switches, one circuit receiving address signals to select on each data bus a channel corresponding to the received address, one circuit receiving control signals designed to validate either the pair formed by the first output switch and the second input switch, or the pair formed by the second output switch and the first input switch, to validate the setting up of a connection between the video transmitting means of the associated subscriber terminal and the selected channel.

4 Claims, 3 Drawing Figures

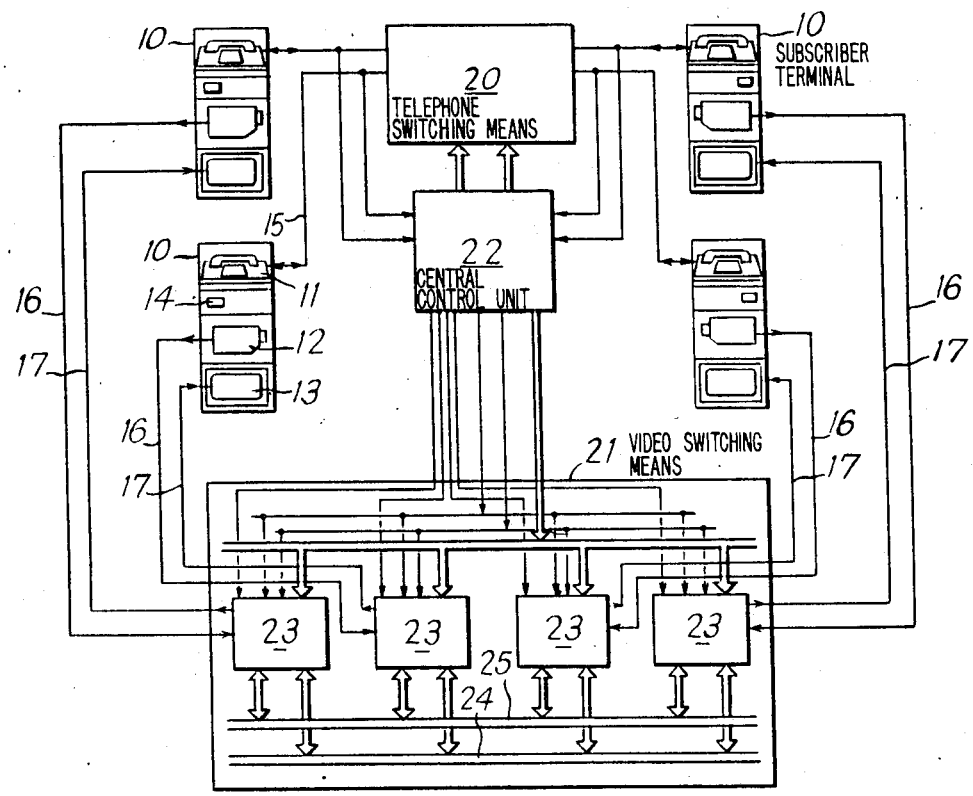

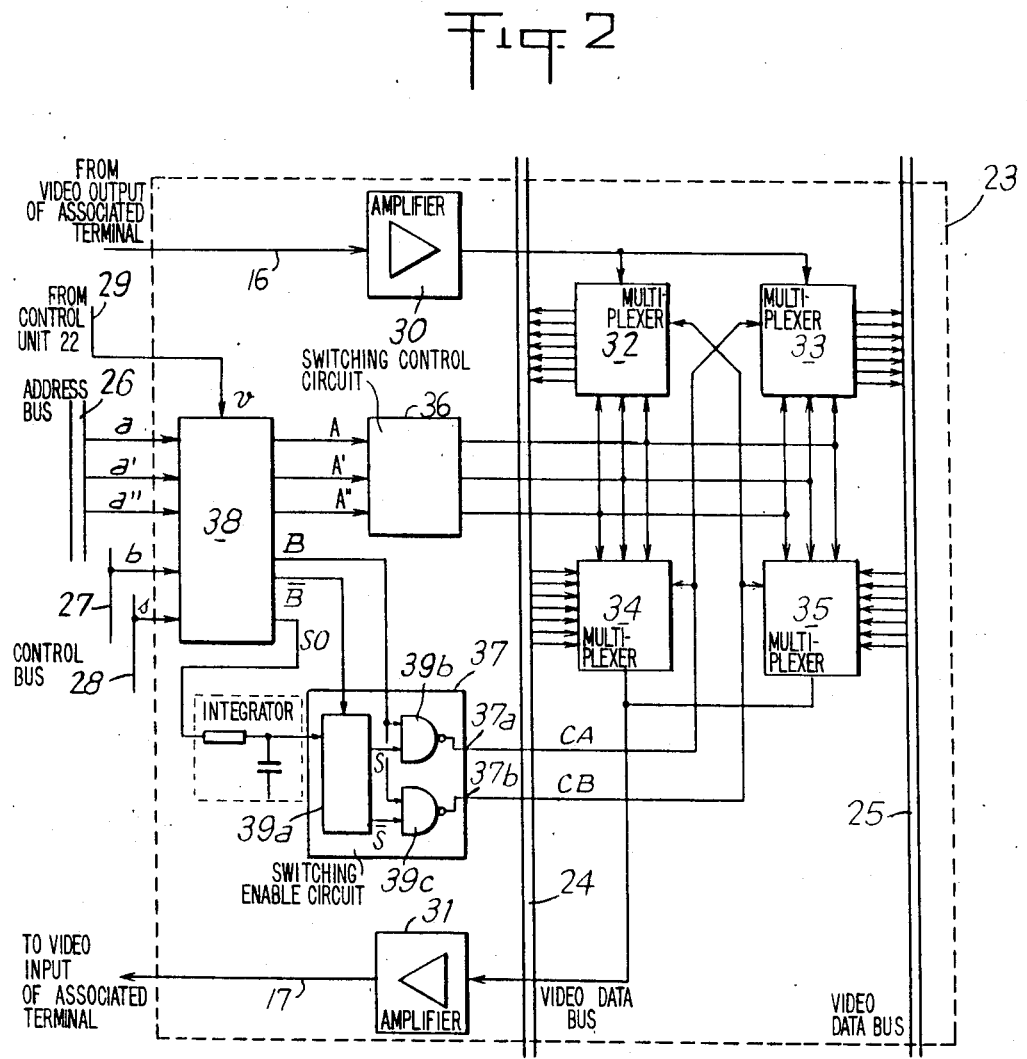

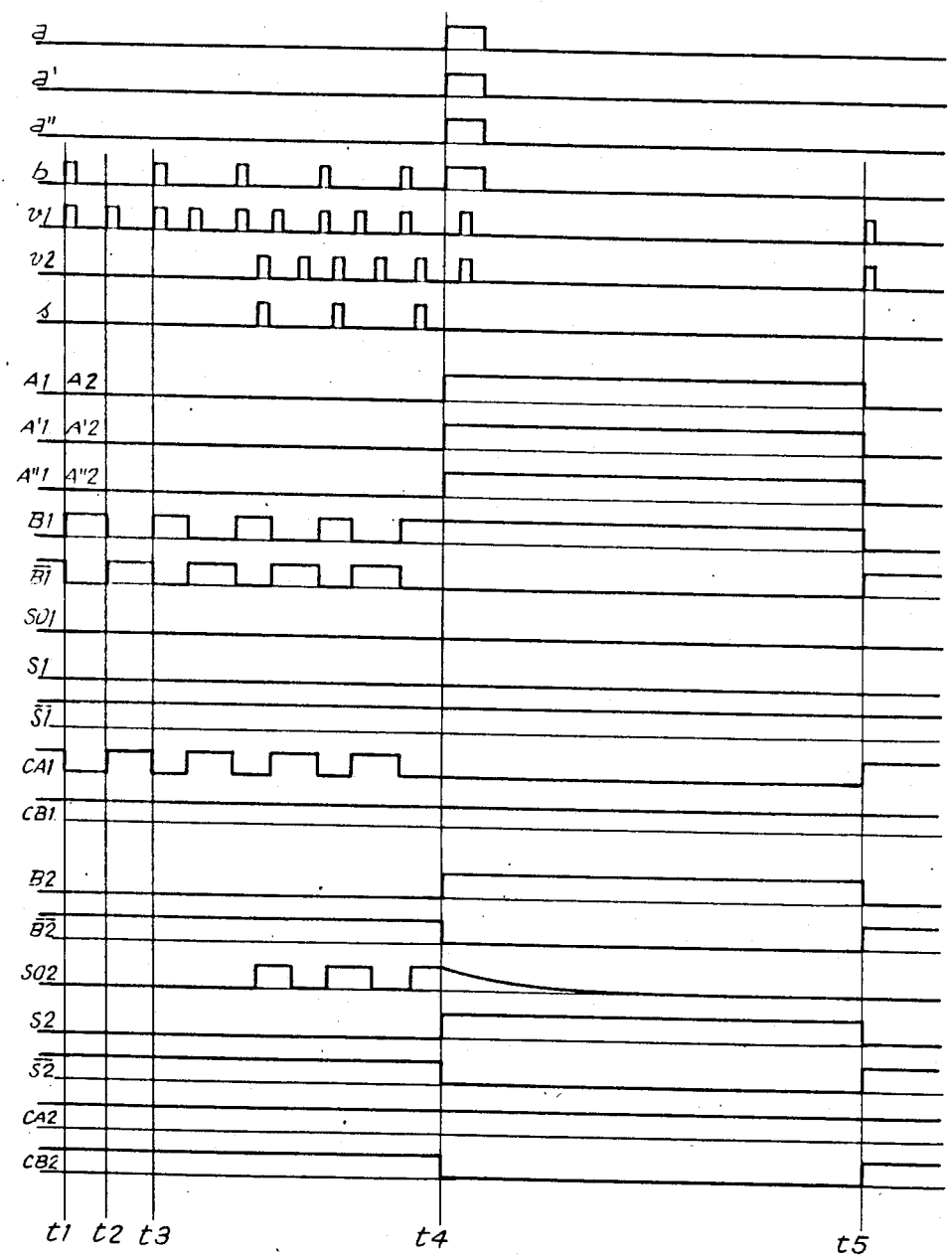

SWITCHING SYSTEM WITH VIDEO SWITCHING MATRIX

The present invention relates to a switching system of the type comprising a video switching matrix setting up a dual video connection between a calling terminal and a called terminal in a telecommunication network regrouping an array of N subscriber terminals each of which is provided with means for transmitting and receiving video signals.

The field of application of the invention is more particularly but not exclusively that of networks known as "videophone" networks permitting to set up between two subscriber terminals, first a conventional telephone audio connection and, second, and simultaneously, a dual video connection.

In such types of networks, it is known to use a video switching system which is separate from the telephone switching system and which is controlled by signals produced by a device controlling the telephone switching system. Reference can for example be made to French Patent Application No. 2 210 875 which describes such a video switching system using a matrix of connecting points.

The object of the present invention is to propose a switching system of the type defined hereinabove, in which the video switching matrix and the means of controlling same are simplified.

This object is reached due to the fact that the video switching matrix comprises, according to the invention:

(a) first and second data bus, each one comprising n conductors or channels for routing the video signals, (b) at least one address bus, (c) control conductors, and (d) an array of N switching points, each one being associated to a respective subscriber terminal and being connected to said bus and conductors, each switching point comprising:

first and second output switches, each having one input and n outputs, the inputs of said output switches being jointly connected to the video transmitting means of the associated terminal, the n outputs of the first output switch being connected to the first data bus and the n outputs of the second output switch being connected to the second data bus, first and second input switches, each having n inputs and one output, the outputs of said input switches being jointly connected to the video receiving means of the associated terminal, the n inputs of the first input switch being connected to the first data bus and the n inputs of the second input switch being connected to the second data bus, a circuit receiving address signals transmitted on the address conductor or conductors and producing control signals applied in parallel to the output and input switches, in order to select on each data bus a channel corresponding to the receiving address, and a circuit receiving the control signals transmitted on the control conductors and having a first output connected in parallel to inputs of validation of the first output switch and of the second input switch and a second output connected in parallel to inputs of validation of the second output switch and of the first input switch, so as to validate, if necessary, and depending on the received validation signal, either the pair formed by the first output switch and the second input switch, or the pair formed by the second output switch and the first input switch, to validate the setting up of a connection between the video transmission means of the associated terminal and the channel selected on one of the data bus, and of a connection between the channel selected on the other data bus and the video receiving means of the associated terminal.

The video matrix of the switching system according to the invention is particularly remarkable in that it comprises a dual data bus for setting up the dual video connection, this enabling a greater simplification of the video switching.

According to another characteristic of said video matrix, selection between either of the pairs of output and input switches is dependent on whether the associated terminal is a calling terminal or a called terminal.

The four switches of each switching point are preferably constituted by analog multiplexer/demultiplexer circuits with n channels, in the form of integrated circuits.

The invention will be more readily understood on reading the following description with reference to the accompanying drawings in which:

FIG. 1 shows part of a general diagram illustrating a network using a switching system with video matrix according to the present invention, FIG. 2 is a more detailed diagram of a switching point of the video matrix of the switching system according to FIG. 1, and FIG. 3 is a timing chart illustrating the signals applied to the switching point of FIG. 2.

Referring first to FIG. 1, this shows a "videophone" network used for setting up an audio connection and a dual video connection between two subscriber terminals 10. In the illustrated example, there are four terminals connected to the network, this number of course being in no way restrictive.

Each terminal 10 comprises a conventional telephone set 11, a television camera 12 for converting into video signals the image of the user of the terminal, or any other image that the user wishes to transmit, and a television receiver 13 for displaying the image represented by the received video signals. An authorization key 14 is also provided to enable the user to allow or not the transmission of video signals from that terminal during a call.

Each terminal 10 is connected to a switching system by a conventional telephone line 15 connected to the telephone set 11, an outgoing video line 16 receiving the signals produced by the camera 12, and a return video line 17 transmitting the video signals received at the input to the receiver 13.

Said switching system comprises a telephone switching means 20, a video switching means 21 and a central control unit 22. The telephone lines 15 of the different terminals 10 end to the telephone switching means 20 whereas the outgoing 16 and return 17 video lines of the different terminals arrive to and start from the video switching means 21. The central control unit receives the indicator signals transmitted by the telephone lines 15 and generates, in response, control signals for the switching means 20 and 21.

The telephone switching means 20 and its control are realized in a manner known per se; they will not therefore be described here in details as the invention relates to the video switching means 21.

The video switching means 21 is of the type including a video matrix and comprises a plurality of identical switching points or circuits, the number of which is equal to that of the terminals 10. Each switching point is associated to respective terminal to which it is connected by lines 16 and 17. The video matrix further comprises: two separate video data bus 24, 25 each one being connected in bidirectional manner to each switching point 23, address conductors 26 forming an address bus to receive address signals produced by the control unit 22 and to which each switching point 23 is connected, two control wires 27, 28 forming a control bus receiving general validation and ringing signals produced by the control unit 22 and to which is connected every switching point 23, as well as conductors 29 in a number equal to that of the switching points 23, each conductor 29˙ connecting the control circuit 22 to a respective switching point for transmitting thereto a respective validation signal.

An embodiment of each switching point 23 will now be described with reference to FIG. 2.

Line 16 of the associated terminal reaches to the input of an amplifier 30 whose output is connected in parallel to the inputs of two output switches 32, 33 with one input and n outputs, n being equal to the number of conductors or channels in each data bus 24, 25. The n outputs of the switch 32 are each connected to a respective one of the channels of bus 24 whereas the n outputs of the switch 33 are each connected to a respective one of the channels of bus 25.

Line 17 of the associated terminal is connected to the output of an amplifier 31 whose input is connected in parallel to the outputs of input switches 34, 35 with n inputs and one output. The n inputs of the switch 34 are each connected to a respective one of the channels of bus 24 whereas the n inputs of the switch 35 are each connected to a respective one of the channels of bus 25.

Switches 32 to 35 are, for example, multiplexer circuits produced in the form of integrated circuits. The selection of a particular output of switches 32 and 33 and of a particular input of switches 34 and 35 is realized by applying control signals on switching control inputs of said switches. Said control signals are produced by a circuit 36 from the address signals conveyed by the bus 26. The same control signals are applied in parallel to switches 32 to 35, so that the two channels to which these switches are connected, are selected by the same address signal.

Each switch 32 to 35 further comprises a validation input permitting to authorize or not the connection between the input (or output) of the switch and one of its outputs (or inputs). Without validation, no connection can be set up by the switch in question. From the validation and ringing signals transmitted on the control conductors, a circuit 37 generates on a first output 37a, a signal CA applied in parallel to the validation inputs of switches 33 and 34 or, on a second output 37b, a signal CB applied in parallel to the validation inputs of switches 32 and 35, so that either the pair of switches 33 and 34, or the pair of switches 32 and 35 can, if necessary, be validated.

A circuit 38 formed by an assembly of flip-flops receives: address signals a, a', a" conveyed by bus 26; a general validation signal b and a general ringing signal s conveyed by bus 27 and 28; and a particular signal v of validation of the associated terminal transmitted on a conductor 29˙.

Signal v is applied to a control input of circuit 38 to make said circuit transparent to other signals received when signal v is at a high level, and to lock same in the last status when signal v passes to the low level and until it returns to the high level.

Address signals a, a', a" in pulse form, are converted by circuit 38 to state signals A, A', A" applied to circuit 36. Said circuit acts as an interface between flip-flops 38 and switching circuits 32 to 35.

General validation signal b is converted by circuit 38 to complementary state signals B, $\overline{B}$ and the ringing signal is converted to state signal SO. Said state signal SO varies in accordance with the pulse rate of the ringing signal. It is integrated and applied to a flip-flop 39a which supplies complementary state signals S, $\overline{S}$ indicating the presence or absence of a ringing signal, said flip-flop 39a receiving state signal $\overline{B}$ on a control input. State signals S and $\overline{S}$ are respectively applied on the first input of two NOR-AND gates 39b, 39c receiving state signal B on their second inputs. Said gates 39b, 39c and flip-flop 39a form the circuit 37. Said circuit produces signals CA and CB in relation to state signals B, $\overline{B}$, S and $\overline{S}$. In the illustrated example, signal CA is produced when the associated terminal is calling (CA = $\overline{S}\cdot B$) and signal CB is produced when the associated terminal is called (CB = $S \cdot B$), validation of switches 32 to 35 becoming effective in this case, when control signal CA or CB passes to the low level.

The video switch described hereinabove works as follows. Reference will be made to FIG. 3 which shows signals a, a', a", b, v and s as well as state signals A, A', A", B, $\overline{B}$, SO $\overline{S}$, S, CA, CB for the switching point of the called terminal (indicated by the numeral 1) and for the switching point of the called terminal (indicated by the numeral 2).

When picking up at the calling terminal (time t1) a pulse is produced on each of the conductors conveying signals b(b1 = b2 = b) and v1. The state signals A, A', A" (A = A1 = A2 ; A' = A'1 = A'2 and A" = A"1 = A"2) are at the low level, as well as B1, B2, S1, S2, $\overline{CA1}$, $\overline{CA2}$ and $\overline{CB2}$ whereas the state signals B1, B2, $\overline{S1}$, $\overline{S2}$ and $\overline{CB1}$ are at the high level. No connection is made.

When dialling of the called terminal starts (time t2), a new pulse is produced on the conductor conveying signal v1, this reversing the state signals B1, $\overline{B1}$, and CA1.

From the beginning of ringing (time t3), pulses are produced on the bus 27 (signal b) and on the conductor 29 conveying signal v1. By way of example, the signal b is then formed by a succession of pulses of fixed duration (3,5 secs) whereas the signal v1 follows the tone rate and comprises a first succession of identical and synchronous pulses, and a second succession of analog pulses shifted by a fixed time interval (1.5 secs) with respect to the first one. The circuit 22 then produces, first, a general ringing signal ρ(s1 = s2 = s) in the form of a train of pulses of fixed frequency and, second, a particular validation signal v2 of the called terminal, in the form of a train of pulses of fixed frequency which is twice the frequency of the general ringing signal (for example 1 HZ). State signal SO2 varies at the rate of the ringing, but S2 remains at the low level because of the phase difference between the pulses of the general validation signal and the pulses of the ringing signal. Moreover, state signal CA1 varies in accordance with the tone rate, as v1, the video connection not being set.

When picking up at the called terminal (time t4), the pulse trains produced on the conductors conveying signals b, s, v1 and v2 are interrupted. Thereafter, the address of the selected channel is sent on bus 26 (in the illustrated example, said address is 111 in binary representation, namely A=A'=A"=1). At the same time, a general validation pulse is produced on bus 27 as well as a particular validation pulse on each of the conductors conveying v1 and v2. Said particular validation pulses lock the state signals A1, A'1, A"1 and A2, A'2, A"2 in the switching points associated to the called and calling terminals, and lock $\overline{B1}$, $\overline{B2}$ at the high level, and B1, B2 at the low level. SO1 and S1 remain at the low level whereas CB1 and CA2 remain at the high level. SO2 being at the high level, the pulse of signal b validates S2 at the high level before SO2 returns to the low level through discharge of the capacitor of an integration circuit placed at the input to the flip-flop delivering S2. The passage of S2 to the high level causes the passage of CB2 to the low level, hence the validation of the switches 32 and 35 of the switching point associated to the called terminal. The simultaneous presence of CA1 and CB2 at the low level sets up the dual video connection on the selected channels.

When hanging up at one of the calling and called terminals (time t5), a pulse is produced on each of the two conductors 29 conveying the signals v1 and v2. A, A', A" return to the low level, as well as B1, B2 and S2. The return of CA1 and CB2 to the high level cuts the video link connection.

It will be noted that the channels of address 000 are kept for a particular use which is the transmission of the tones on the calling terminal. Indeed, the pulses of signals b and v1, before picking up at the called terminal validate periodically the switches 33, 34 associated to the calling terminal on the channels of address 000.

Another channel can be used for an operating terminal.

The invention is in no way limited to the description given hereinabove, and on the contrary covers any modifications than can be brought thereto without departing from the scope of the following claims.

I claim:

1. Switching system with a video switching matrix of the type used for setting up a dual video connection between a calling terminal and a called terminal in a telecommunication network re-grouping an array of N subscriber terminals each of which is provided with means for transmitting and receiving video signals, wherein said video switching matrix comprises:
   (a) first and second data bus, each one comprising n conductors or channels for routing the video signals,
   (b) at least one address bus,
   (c) control conductors, and
   (d) an array of N switching points, each one being associated to a respective subscriber terminal and being connected to said buses and control conductors each switching point comprising;
   first and second output switches each having one data input, n data outputs, one validation input and control inputs, the data inputs of said output switches being jointly connected to the video transmitting means of the associated terminal, the n data outputs of the first output switch being connected to the first data bus and the n outputs of the second output switch being connected to the second data bus,
   first and second input switches each having n data inputs and one data output, one validation input and control inputs, the data output of said input switches being jointly connected to the video receiving means of the associated terminal, the n data inputs of the first input switch being connected to the first data bus and the n data inputs of the second input switch being connected to the second data bus,
   a circuit receiving address signals transmitted on the address bus and producing control signals applied in parallel to the control inputs of said output and input switches, for controlling said switches in order to select on each data bus a channel corresponding to the received address, and
   a circuit receiving the signal transmitted on the control conductors and having a first output connected in parallel to the validation inputs of the first output switch and of the second input switch and a second output connected in parallel to the validation inputs of the second output switch and of the first input switch, so as to, enable depending on the signals received from said control conductors, either the pair formed by the first output switch and the second input switch, or the pair formed by the second output switch and the first input switch, to allow the setting up of a connection between the video transmission means of the associated terminal and the channel selected on one of the data buses, and of a connection between the channel selected on the other data bus and the video receiving means of the associated terminal.

2. Switching system as claimed in claim 1, wherein selection between either of the pairs of output and input switches is dependent on whether the associated terminal is a calling terminal or a called terminal.

3. Switching system as claimed in claim 1, wherein the four switches of each switching point are constituted by analog multiplexer/demultiplexer circuits with n channels.

4. Switching system as claimed in claim 1, wherein the control conductors comprise a bus on which is transmitted a general validation signal, a bus on which is transmitted a general ringing signal and conductors which are respectively connected to the different switching points for transmitting special validation signals thereto.

* * * * *